United States Patent [19]

Komine

[11] 3,914,034
[45] Oct. 21, 1975

[54] CAMERA SYSTEM, ESPECIALLY MOTION PICTURE CAMERA SYSTEM WITH INTERCHANGEABLE LENSES

[75] Inventor: Yoshio Komine, Tokyo, Japan

[73] Assignee: Canon Kabushiki Kaisha, Tokyo, Japan

[22] Filed: Sept. 11, 1974

[21] Appl. No.: 504,893

[30] Foreign Application Priority Data
Sept. 14, 1973 Japan.............................. 48-104316
Oct. 1, 1973 Japan.............................. 48-111246

[52] U.S. Cl. ................ 352/142; 354/197; 354/199; 354/201
[51] Int. Cl.² .......................................... G03B 3/00
[58] Field of Search ............ 352/142; 354/197, 199, 354/201

[56] References Cited
UNITED STATES PATENTS
3,127,809  4/1964  Denk .............................. 352/142 X
3,605,596  9/1971  Vockenhuber ................ 354/199 X

*Primary Examiner*—Monroe H. Hayes
*Attorney, Agent, or Firm*—Toren, McGeady and Stanger

[57] ABSTRACT
A camera system, especially a motion picture camera system for use with interchangeable lenses. A first type of lens unit of such interchangeable lenses includes a first opening for permitting the incidence of a light beam coming from an object and a second opening permitting the emergence of a light beam coming from the first opening. The system is also adapted to be used with a second type of interchangeable lens unit which includes a first opening permitting the incidence of a light beam coming from an object, a beam splitter for splitting the beam coming from the first opening along a first and a second direction, and a second opening permitting the emergence of the beam split along the first direction. A third opening is also provided which permits the emergence of the beam split along the second direction. Each of the two types of lens units can be used selectively. The camera body itself includes a first opening at a position which corresponds to the second opening of the first type of interchangeable lens units when that unit is attached to the camera. The first camera opening also corresponds to the second opening of the second interchangeable lens unit type when that type is attached to the camera. A second opening in the camera body is made available at a position corresponding to the third opening of the second unit of interchangeable lenses when it is attached to the camera. Finder optics are included, part of which is disposed behind the second opening of the camera.

13 Claims, 11 Drawing Figures

FIG.5
FIG.4
FIG.8
FIG.7
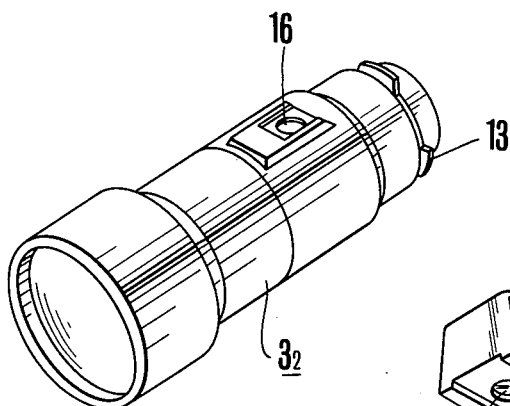
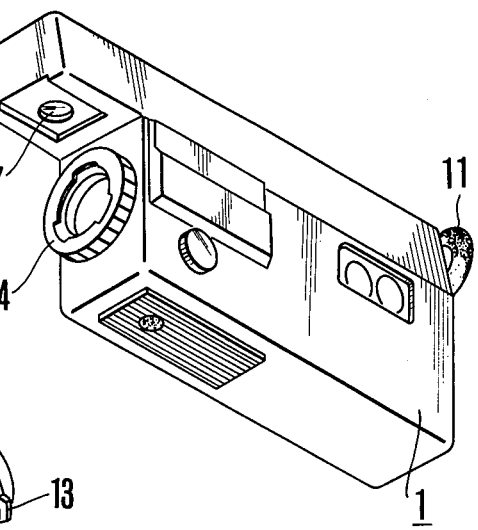
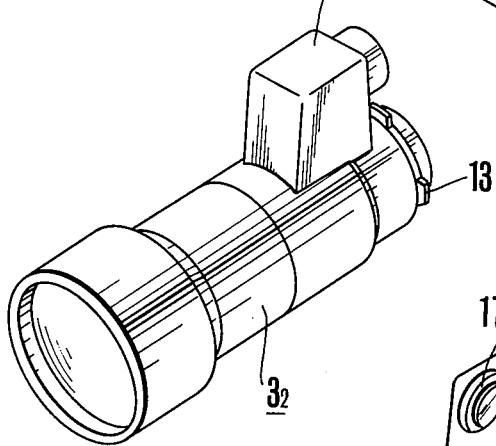
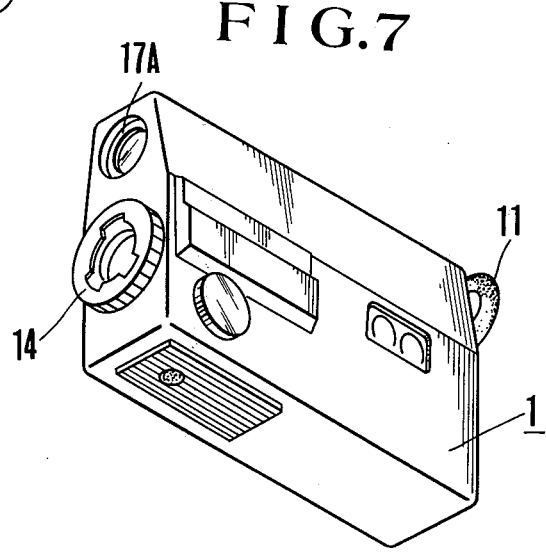

CAMERA SYSTEM, ESPECIALLY MOTION PICTURE CAMERA SYSTEM WITH INTERCHANGEABLE LENSES

BACKGROUND OF THE INVENTION

1. Field of the Invention

The present invention relates to a camera system, especially a motion picture camera system with interchangeable lens according to which various kinds of lens units can be exchanged selectively.

2. Description of the Prior Art:

Until now motion picture cameras in which various kinds of lens units can be exchanged selectively are widely known.

Generally speaking this kind of motion picture camera does not present a diaphragm means in the camera body but in the unit of interchangable lenses in such a manner that the diaphragm means is controlled by means of the information signal coming from the camera body.

Further in the finder system of the motion picture camera there are two kinds, namely a view finder system and a single reflex system. With the increased use of zoom lenses, the single reflex type view finder in which the image is recognized by means of the beam coming through the photographing lens is used more and more. In the motion picture camera with single reflex type finder and built-in zoom lens which camera is not capable of lens exchange, in front of the diaphragm means disposed between the magnifying optics, and the image forming optics a beam splitter is generally provided in such a manner that a part of the beam split here is supplied to the finder optics so that the photographer can always obtain a bright field regardless of the iris value.

However in the motion picture camera which is incapable of lens exchange, between the mount part for the lens to be exchanged and the image forming part a mirror which operates in functional engagement with the shutter so as to supply the beam to the finder optics while the shutter is preventing the beam from reading the photosensitive material in order to enable the realization of a single reflex type finder or between the lens unit and the image forming plane on the photosensitive material, a mirror member is provided. The mirror member is arranged so that the beam coming from the object is supplied to the finder optics only when the beam is prevented from reaching the photosensitive material by rotating or vibrating the above mentioned mirror member. However both of the above systems present such a weak point that the beam coming from the object through the diaphragm is dark and further is supplied intermittently so that it is hard for the photographer looking at the object through the finder to observe the object.

Until now in order to overcome such difficulties as mentioned above, in the beam path of the image forming optics in the unit of interchangable lens a beam splitter is provided while on the unit of interchangeable lens a finder barrel in which a finder optics for receiving the beam split by means of the beam splitter is built, is fitted firmly so as to obtain a bright and not flickering beam from the object. However in case of the above mentioned unit of interchangeable lens with finder optics, because it is essential that the interchangeable lens should be mounted in front of the camera while the eye piece of the finder optics has to be situated at the back of the camera body, the finder barrel has to be constructed narrow and long which causes trouble as to the strength. Furthermore, because it is also essential that when the unit is attached on the mount part of the camera body, the finder barrel should be rotated so as to locate the eye piece before the mount part in order to prevent the finder barrel from being hindered by the camera body, the construction of the finder barrel becomes much complicated. Moreover, the manufacturing cost of such system is remarkably high because one finder unit is built in each unit of interchangeable lens. Further, another shortcoming of this type of the unit of interchangeable lens is that because the finder-visual field mask is not in the camera body, the exposure information and other informations produced in the camera body can not be indicated inside of the finder.

SUMMARY OF THE INVENTION:

The first purpose of the present invention is to offer a new motion picture camera system according to which the difficulties of the conventional camera system with interchangeable lenses are overcome.

The second purpose of the present invention is to offer a motion picture camera system according to which various kinds of the unit of interchangeable lens can be used selectively.

The third purpose of the present invention is to offer a motion picture camera system according to which it is always possible to observe a bright image of the object in the finder by applying exclusive interchangeable lenses.

The fourth purpose of the present invention is to offer a motion picture camera system according to which it is possible to obtain a sufficient and not flickering beam from the object in the finder.

Other purposes of the present invention will be disclosed and explained below according to the attached drawings.

BRIEF DISCRIPTION OF THE DRAWINGS

FIG. 1(a) and (b) are respectively a plan view of a conventional motion picture camera system with interchangeable lenses whereby the disposition of each optics is shown.

FIG. 4 shows the camera body of FIG. 3 in perspective view.

FIG. 5 shows the unit of interchangeable lens of FIG. 3 in perspective view.

FIG. 7 shows the camera body of FIG. 6 in perspective view.

FIG. 8 shows the unit of interchangeable lens of FIG. 6 in perspective view.

Figure 1A:
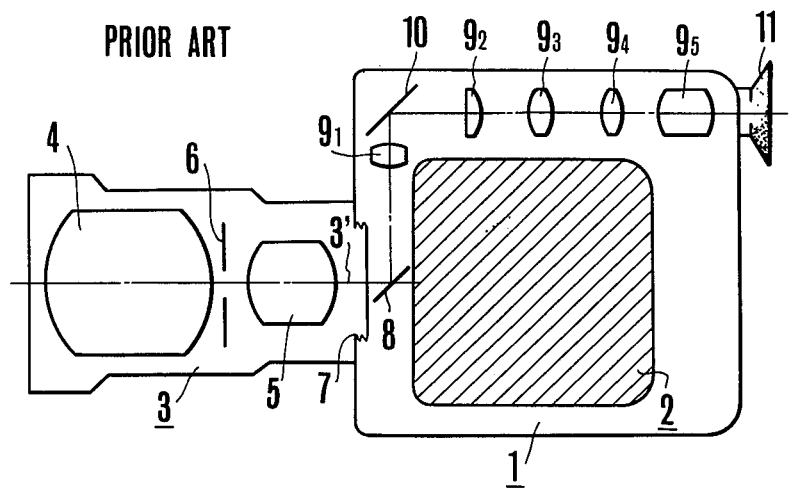
Figure 1B:
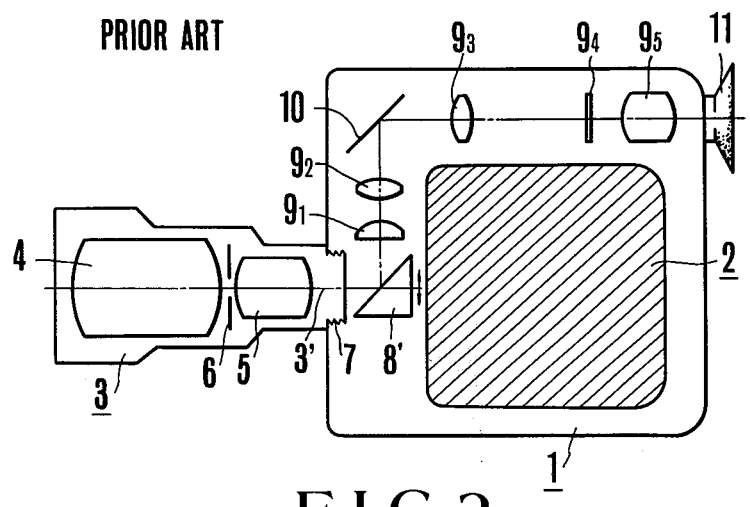

DESCRIPTION OF THE PREFERRED EMBODIMENT:

FIGS. 1(a) and 1(b) are plan views of a conventional motion picture camera system with interchangeable lenses whereby the relation among various optics is shown. In the drawings the camera body 1 and the unit 3 of interchangeable lens are made into one body by engaging the mount screw member 7 of the unit 3 of interchangeable lens in the mount member of the camera. Accordingly, by this screw arrangement any units of interchangeable lens can be mounted selectively. 4 is a group of focussing lenses, 5 a group of relay lens and 6 a diaphragm member disposed between the group 4 of focussing lenses and the group 5 of relay lenses, whereby the diaphragm member 6 controls the beam passing through the photographing optics consisting of the group 4 of focussing lenses and of the group 5 of relay lenses by means of the information signal coming from an exposure determining circuit (not shown in the drawing) in the camera body. 2 is a film magazine contained in the magazine chamber of the camera body. 8 in FIG. 1(a) is a semipermeable mirror composing a beam splitter, being disposed between the photographing optics and the photosensitive plane 2' of the film magazine and presenting an angle of 45° to the optical axis 3' of the photographing optics, whereby the semipermeable mirror splits the beam coming from the object through the photographing optics into the one beam for the photosensitive plane 2' of the film magazine 2 along the first optical axis and the other beam for the finder optics along the second optical axis. 9 is the finder optics consisting of lens groups $9_1$, $9_2$, $9_3$, $9_4$, $9_5$ and $9_6$, 10 is the refraction mirror and 11 is the eye piece. In this motion picture camera system, the beam having passed through the focussing lens group 4, the diaphragm 6 and the relay lens group 5 arrives at the photosensitive plane 2' intermittently by means of a rotary shutter (not shown in the drawing) provided between the semipermeable mirror 8 and the photosensitive plane 2' on the other hand and at the same time to enter into the finder optics 9 by means of the semipermeable mirror 8 on the other hand. However, the beam coming from the object through the photographing optics is reduced in its intensity by means of the diaphragm member 6 in such a manner that for the photographer who observes the object through the finder optics with the beam with low intensity it is hard to recognize the object.

FIG. 1(b) shows further another conventional embodiment which presents a mirror shutter 8' being provided between the photographing optics and the photosensitive plane 2' of the film magazine 2 and presenting an angle of 45° to the optical axis of the photographing optics, whereby the shutter mirror 8' moves upwards and downwards, making a right angle to the optical axis 3' of the photographing optics, permitting the beam coming from the object to arrive at the photosensitive plane 2' of the film magazing 2 and prohibiting the beam to enter into the finder optics when the shutter mirror 8' is not on the optical axis 3', while when the shutter mirror 8' is on the optical axis 3' the shutter mirror 8' prohibits the beam coming from the object from arriving at the photosensitive plane 2' of the film magazine 2 and at the same time permits the beam to enter the finder optics.

According to this type, the beam coming from the object is reduced in its intensity by means of the diaphragm member 6 while the beam coming from the object appears and disappears in the finder so that it is hard for the photographer to observe the object and further it is not good for the eyes.

Figure 2:
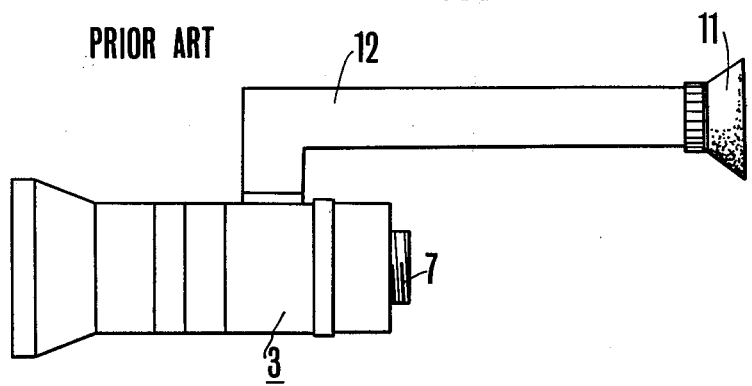
FIG. 2 shows another conventional motion picture camera with interchangeable lens in perspective view.

FIG. 2 shows the second conventional embodiment in perspective view whereby in order to overcome the shortcoming of the embodiment shown in FIG. 1 that the finder is dark and the object flickers so that it is hard for the photographer to observe the object, a beam splitter is built in between the focussing lens and the diaphragm member. On the barrel of the unit 3 of interchangeable lens a finder barrel 13 with a built-in finder optics receiving a beam split by the beam splitter is fixed firmly in such a manner that it is possible for the photographer to observe a bright and non flickering object.

In this type of unit, because the finder unit 12 is extended toward the camera body so that the finder unit 12 strikes at the camera body when the lens unit is engaged on the mount member of the camera body by means of the mount screw member 7, it is necessary to rotate the finder unit 12 once in such a manner that the eye piece 11 of the finder unit 12 comes in from of the unit 3 of interchangeable lens so that the construction becomes complicated. Furthermore because a finder unit 12 is necessary for each unit of interchangeable lens the manufacturing cost becomes considerably higher. Still further because the narrow finder unit 12 extends longer than the lens unit 3, the mechanical strength may become a problem.

Figure 3:
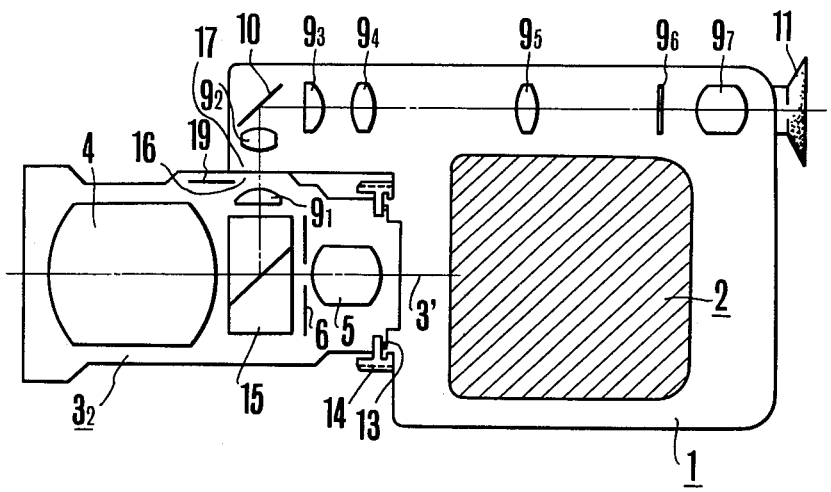
FIG. 3 is a section for explaining the relation among the unit of interchangeable lens according to the motion picture camera according to the present invention, the camera body and other principal members.

FIG. 3 shows a section of the first embodiment of the motion picture camera system according to the present invention whereby the relation among the unit 3 of interchangeable lens, the camera body 1 and other principal members is shown. FIG. 4 shows the camera body of the motion picture camera system shown in FIG. 3 in perspective view.

The same parts in FIG. 3 and 4 as in FIG. 1 and 2 have the same numeral designations so that their explanations are omitted here.

13 is the bayonet mount on the lens side for engaging the unit 3 of interchangeable lens with the camera body, and 14 the bayonet mount on the camera body. 15 is the beam splitter provided in front of the diaphragm member 6 between the focussing lens system 4 and relay system 5 of the unit 3 of interchangeable lens 3, 16 the opening for leading the beam split by the beam splitter 15 toward the camera body 1, 9A lens groups in the finder optics in the unit 3 of interchangeable lens, 9B the finder optics built in the camera body and 19 and shutter closing the opening 16. When in the above mentioned construction, after the unit $3_1$ of interchangeable lens is put into the camera body 1 and the bayonet 14 is rotated, the bayonet 14 engages with the bayonet 13 in such a manner that the unit $3_1$ of interchangeable lens and the camera body 1 are united into one body. At this time, the beam projecting opening 16 of the unit $3_1$ of interchangeable lens engages with the beam receiving opening 17 of the finder in the camera body in such a manner that a finder light path is formed while the shutter, which has being closing the beam projecting opening 16, retires from the light path manually or automatically in functional engagement with the engaging operation. Thus it becomes possible for the photographer to observe the object through the finder with the continuous and bright beam taken from in front of the diaphragm. Because further it is so constructed that the beam taken from a right angle to the optical axis of the photographing lenses by means of the beam splitter in the unit of interchangeable lens is received by the finder member of the camera body, the beam receiving opening assumes, as is shown in FIG. 4, a form of projection in front of the camera body. It is possible, as is shown in FIG. 5, to design the barrel of the interchangeable lens similar to conventional interchangeable lens.

Figure 6:
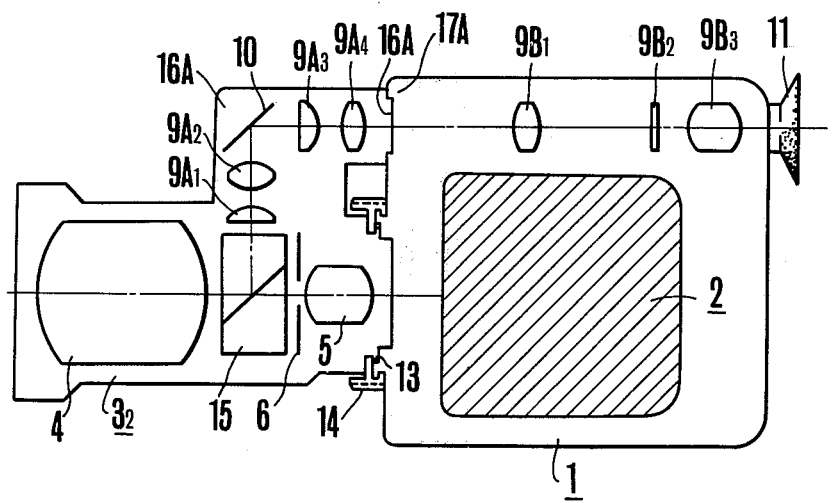
FIG. 6 shows a section along the second embodiment of the motion picture camera system according to the present invention whereby the relation among the unit of interchangeable lens, the camera body and the principal member is indicated.

FIG. 6 shows a section along the second embodiment of the motion picture camera system according to the present invention, whereby the relation among the unit of interchangeable lens, the camera body and the principal members is shown. FIG. 7 shows the camera body 1 of FIG. 6 in perspective view. FIG. 8 shows the unit 3 of interchangeable lens. 16A is the beam projecting opening for leading the beam split by means of the beam splitter 15 to the camera body 1, 17A is the beam receiving opening of the finder in the camera body 1. Accordingly, when similar to the first embodiment after the unit $3_2$ of interchangeable unit is put into the camera body 1 and the bayonet 14 is rotated, the bayonet 14 engages with the bayonet 13 in such a manner that the unit 3 of interchangeable lens and the camera body 1 are united into one body. At this time, the beam projecting opening 16A of the unit 3 of interchangeable lens engages with the beam receiving opening 17A of the finder in the camera body 1 in such a manner that a finder beam path is formed. Thus the second embodiment of the present invention has the advantage that there is no restriction about on the outer diameter of the interchangeable lens. Also its outer dimension becomes a little large as compared with that of the first embodiment, because it is so constructed that the finder optics of the camera body is situated behind the front face presenting the mount 14 of the camera body and the finder optics therebefore is in the interchangeable lens.

FIG. 3 to 8 show other embodiments according to the present invention for which special and exclusive units of interchangeable lens are needed.

Below, the third embodiment of the motion picture system according to the present invention will be explained which presents the first opening for receiving the beam coming from the object and the second opening for projecting the beam coming from the object through the first opening whereby other ordinary lens units can also be used selectively.

Figure 9:
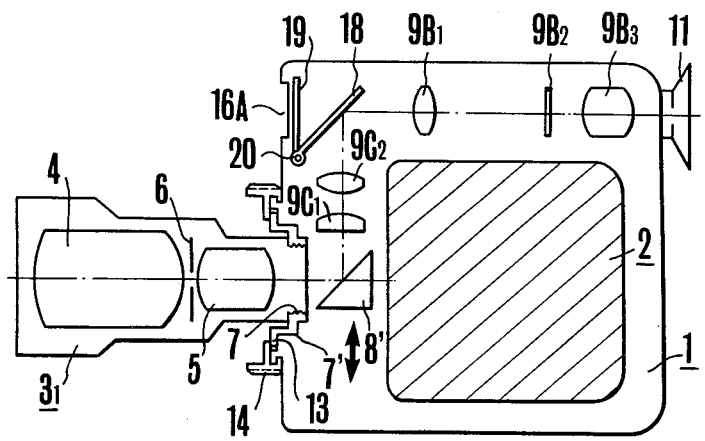
FIG. 9 shows a section along the third embodyment of the motion picture camera system according to the present invention.
Figure 10:
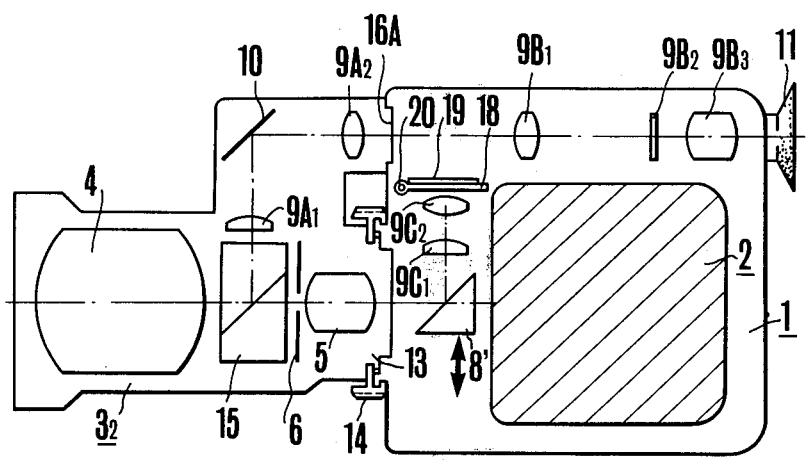
FIG. 10 shows also a section whereby a type of interchangeable lens unit other than that shown in FIG. 9 is mounted.

FIG. 9 and 10 serves to explain this third embodiment, whereby the same parts in the drawings as those in FIG. 1 to 8 bear the same FIGS.

FIG. 9 shows an ordinary unit of interchangeable lens ppresenting the first and the second opening in the mounted state.

FIG. 10 shows a unit of interchangeable lens presenting an exclusive mount.

In FIG. 9, 7' is an adapter to be attached to the exclusive bayonet mount 13 of the camera body 1 and to permit the mount of the screw mount lenses. 18 is a totally reflecting mirror rotatable around the shaft 20 and 19 a member to close the beam receiving opening 16 of the finder on the front face of the camera, whereby in the state shown in FIG. 9 the member 19 closes the beam receiving opening 16 of the finder. Further in this state, the totally reflecting mirror 18 transmits the beam being sent intermittently by means of the movement of the mirror shutter 8' along the direction of the double arrow into the second finder optics 9B by means of the the first finder optics 9C whereby the finder is constructed in the same way as that shown in FIG. 1(b). In FIG. 10, similar to that shown in FIG. 3 and 6 a bright beam is sent into the beam projecting opening of the finder of the interchangeable lens by means of an exclusive interchangeable lens. When at this time the totally reflecting mirror is moved from the position shown in FIG. 9 down to that shown in FIG. 10 in such a manner that the mirror is out of the beam path of the second finder optics, closing the beam path of the first finder optics 9C, in functional engagement of the retire of the totally reflecting mirror 18, the member 19 for closing the beam receiving opening of the finder moves from the position shown in FIG. 9 down to that shown in FIG. 10. This is done so that the beam coming from the beam projecting opening of the finder of the interchangeable lens is introduced into the seconder finder optics. In this state, the finder is constructed in the same way as that shown in FIG. 5 and 6.

Thus the present invention offers a motion picture camera system with interchangeable lens presenting such advantage that it is possible to observe the object continuously with a bright finder image by applying exclusive interchangeable lens. This is done even when using lenses with ordinary screw mounts so that it is possible to observe the object by making use of the finder beam path by exchanging the lenses selectively.

What is claimed is:

1. In a motion picture camera system having a camera body and a lens unit and wherein said lens unit is selected from a group of interchangeable lens units removably mountable on said camera body by engaging means, wherein the improvement comprises:

a housing for said lens unit having a first opening for permitting incidence of light coming from the object at one end, a second opening at the other end of permitting the emergence of light derived from said light coming from said first opening and a third opening being provided therein;

photographic optics, disposed within said lens housing, including a focusing optical unit and a relay optical unit, said focusing unit being movable along the optical axis, said relay optical unit being fixed in position;

light beam controlling means for controlling quantity of light from the object after it passes through said first opening, said controlling means being disposed between said focusing optics and said relay optics;

beam splitting means being disposed between said focusing optics and said light beam controlling means, said splitting means for splitting a first light beam from said first opening into a second light beam for said second opening and a third light beam for said third opening;

said camera body having a first opening at the position corresponding to the second opening of said unit of interchangeable lenses when said lens unit is mounted on said camera body and wherein said camera body includes a second opening cooperating with said third opening of said lens unit;

and finder optics, part of which is disposed behind said second camera opening, for transmitting said third beam from said splitting means in said lens unit so as to provide a bright image of said object.

2. A motion picture camera system according to claim 1 wherein said first opening of said camera body lies in a first plane and said second opening of said camera body lies in a second plane, said two planes being substantially perpendicular.

3. A motion picture camera system according to claim 1 wherein said finder optics includes first and second optical portions and a finder optics switching means for switching said finder optics, said first finder optics conveying the beam coming from the object through said first opening of said camera body into the finder; said second finder optics conveying the beam coming from the object through said second opening of said camera body into the finder; and wherein said finder optics switching means closing either of the first or the second finder optics selectively.

4. A motion picture camera system according to claim 3 wherein said finder optics switching means includes a closing member which closes said second opening of camera body selectively in functional engagement of the operation of said finder optics switching means.

5. A motion picture camera system according to claim 1 wherein said engaging means includes a portion provided on a part of said unit of interchangeable lenses and a portion provided at a part of said camera body.

6. The camera system of claim 1 wherein said third opening of said lens unit is provided in a direction substantially perpendicular to the direction of light from said object and said second opening of said camera body is juxtaposed to said third opening of said lens unit.

7. The camera system of claim 1 wherein said third opening of said lens unit is provided in the same plane as the second opening of said lens unit.

8. A motion picture camera system in which two types of units of interchangeable lenses are selectively and removably mountable on said camera body by engaging means, comprising:
   a first unit of interchangeable lenses including a first opening of receiving a light beam coming from the object at one end and a second opening for transmitting the light beam coming from the object through said first opening;
   a second unit of interchangeable lenses including:
      a housing for said lens unit having a first opening receiving a light beam coming from the object at one end, a second opening for transmitting the light beam coming from the object through said first opening at the other end and a third opening being provided therein;
      photographic optics, disposed within said second lens unit, including a focusing optical unit and a relay optical unit, said focusing optical unit being movable along the optical axis, said relay optical unit being fixed in position;
      light beam controlling means for controlling the quantity of light from the object after it passes through said first opening, said controlling means being disposed between said focusing optics and said relay optics;
      and beam splitting means being disposed between said focusing optics and said light beam controlling means, said splitting means for splitting a first light beam from said first opening into a second light beam for said second opening and a third light beam for said third opening;
   said camera body having a first opening at the position corresponding to the second opening of the first and second interchangeable lens units when either of said units is mounted on said camera body, said body also including a second opening situated at the position corresponding to the third opening of said second interchangeable lens unit when said unit is mounted on said camera; and
   finder optics for directing light beam paths including means for directing a first beam path and means for directing a second beam path, part of said first beam path means being provided behind said second opening of said camera for conveying said second beam through said second opening into the finder and a part of the second beam path means being provided behind the first opening of said camera and conveying said third beam to said first opening into the finders, whereby said beam coming from the object through the first opening of said lens unit is conveyed into the finder through a part of said first beam path means and said second beam path means when said first type of interchangeable lens unit is mounted on the camera and wherein said beam coming from the object is conveyed into the finder through said second beam path means when said second interchangeable lens unit is mounted on the camera body.

9. A motion picture camera system according to claim 8 wherein said beam path of the view finder presents a beam path switching means by means of which the beam path means for the optics can be switched selectively according to the type of unit of interchangeable lenses mounted on said camera.

10. A motion picture camera system according to claim 9 wherein said beam path switching means selectively closes either of the openings receiving the beam coming from the object according to the type of the units of interchangeable lenses mounted on said camera.

11. A motion picture camera system according to claim 8 wherein said engaging means includes a portion provided on a part of said unit or interchangeable lens and a portion provided on a part of said camera body.

12. The camera system of claim 8 wherein said third opening of said second lens unit is provided in a direction substantially perpendiccular to the direction of light from said object and said second opening of said camera body is juxtaposed to said third opening of said lens unit.

13. The camera system of claim 8 wherein said third opening of said second lens unit is provided in a plane parallel to the second opening of said lens unit.

* * * * *